US010089139B2

(12) United States Patent
Somerfield (10) Patent No.: US 10,089,139 B2
(45) Date of Patent: Oct. 2, 2018

(54) SYSTEMS, METHODS AND MEDIA FOR MANAGING EMBEDDED CONTENT (71) Applicant: AppSense Limited, Warrington (GB)

(72) Inventor: Richard James Somerfield, San Jose, CA (US)

(73) Assignee: AppSense US LLC, South Jordan, UT (US)

(*) Notice: Subject to any disclaimer, the term of this patent is extended or adjusted under 35 U.S.C. 154(b) by 715 days.

(21) Appl. No.: 13/737,407

(22) Filed: Jan. 9, 2013

(65) Prior Publication Data
US 2014/0195593 A1 Jul. 10, 2014

(51) Int. Cl.
*G06F 9/46* (2006.01)
*G06F 15/16* (2006.01)
*G06F 17/24* (2006.01)
*G06F 17/30* (2006.01)

(52) U.S. Cl.
CPC .............. *G06F 9/468* (2013.01); *G06F 15/16* (2013.01); *G06F 17/24* (2013.01); *G06F 17/3089* (2013.01)

(58) Field of Classification Search
CPC .............................. G06F 17/24; G06F 17/3089
USPC ........................................... 707/711; 709/203
See application file for complete search history.

(56) References Cited

U.S. PATENT DOCUMENTS

| | | | |
|---|---|---|---|
| 8,898,557 B1* | 11/2014 | Vagell | 715/230 |
| 2007/0005990 A1* | 1/2007 | Sathish | H04L 67/14 713/189 |
| 2009/0043896 A1* | 2/2009 | Law | H04L 65/4069 709/228 |
| 2011/0106880 A1* | 5/2011 | Strong et al. | 709/203 |
| 2011/0138064 A1* | 6/2011 | Rieger | G06F 17/30905 709/228 |
| 2011/0282968 A1* | 11/2011 | Oliver | G06F 9/5072 709/217 |
| 2012/0088540 A1* | 4/2012 | Smith | H04W 8/24 455/550.1 |
| 2012/0250858 A1* | 10/2012 | Iqbal et al. | 380/44 |
| 2012/0290657 A1* | 11/2012 | Parks et al. | 709/204 |
| 2013/0007090 A1* | 1/2013 | Sankararaman | 709/201 |
| 2013/0097239 A1* | 4/2013 | Brown | H04L 67/02 709/204 |
| 2013/0174237 A1* | 7/2013 | Zises | 726/7 |
| 2013/0212212 A1* | 8/2013 | Addepalli et al. | 709/217 |
| 2013/0212470 A1* | 8/2013 | Karunamuni et al. | 715/243 |

(Continued)

*Primary Examiner* — Mark D Featherstone
*Assistant Examiner* — Diedra M McQuitery (57) ABSTRACT A method, system and medium can manage embedded content in documents. The method, e.g., includes detecting, at a host device running a host application program, a user's action to initiate editing of content embedded in a document associated with the host application program and querying for the user's content management configuration to determine a target device having an interface suitable for editing the embedded content. If it is determined that the user's configuration specifies a device other than the host device as the target device, the method further includes sending a revision notification to the target device, wherein the notification includes a copy of, or a reference to, the document and receiving an update notification from the target device, wherein the update notification includes one of a copy of or a reference to a latest version of the document including the latest edits made to the embedded content.

18 Claims, 4 Drawing Sheets (56) References Cited

U.S. PATENT DOCUMENTS

2014/0006490 A1\* 1/2014 Setlur .................... G06Q 10/10
709/204
2014/0019497 A1\* 1/2014 Cidon et al. .................. 707/827

\* cited by examiner

SYSTEMS, METHODS AND MEDIA FOR MANAGING EMBEDDED CONTENT

TECHNICAL FIELD

Disclosed systems, methods and media relate to managing embedded content (also referred to as "linked content"). Specifically, disclosed systems, methods and media relate to performing a generation and/or manipulation of embedded content in a document using a device that is most suited for the embedded content.

BACKGROUND

Existing document management systems can provide users with the capability to embed, or link, contents from different application programs. In addition, different devices can provide different interfaces that may be more appropriate for manipulating (e.g., editing) certain types of contents embedded in documents. For example, devices having a touch screen display, such as multi-touch devices, can offer a full screen experience with means for direct manipulations (as opposed to proxied manipulations offered by keyboard video mouse (KVM) input means) for drawing or sketching images or figures (e.g., using fingers or a stylus). However, the same devices are less suitable for editing text-based content because text inputs tend to be entered via an on-screen keyboard with little or no tactile feedback.

When a user interacts with a document to edit content that is embedded in the document, the user's attempt to edit the embedded content can launch an appropriate application for editing of the embedded content. Alternatively, the appropriate application can provide editing controls directly within the embedded content in response to the user's attempt. However, the existing document management systems still rely on single host platform (e.g., a device) as an interaction point for various types of the embedded content in a document regardless of whether the single device provide interfaces that are suitable for all of the embedded content.

SUMMARY

In accordance with the disclosed subject matter, systems, methods and media are provided for managing linked, or embedded, content in a document. Specifically, disclosed systems, methods and media provide for performing a generation and/or manipulation of embedded content in a document using a device having at least one interface that is most suited for generating and/or manipulating the embedded content. For example, a laptop or a desktop device having a mouse, a keyboard and a display screen, may be most suitable for creating and updating a document using a word processing application. On the other hand, a multi-touch device (e.g., a tablet PC or smartphone) may be most suitable for creating or editing an image that is embedded in the document.

The disclosed subject matter includes a method for managing embedded/linked content in a document. The method can include detecting at a host computing device running a host application program a user's action to initiate editing of a first content embedded in a first document associated with the host application program. The method can also include querying for the user's embedded content management configuration to determine a target computing device having an interface suitable for editing the first embedded content. The method can further include, if it is determined that the user's embedded content management configuration specifies a computing device other than the host computing device as the target computing device, sending a first notification to the target computing device. The first notification includes one of a copy of or a reference to the first document indicating where the first document can be located. The method can further include receiving at least one second notification from the target computing device. The second notification includes one of a copy of or a reference to a latest version of the first document including at least latest edits made to the first embedded content by the user.

The disclosed subject matter also includes a host computing device for managing embedded/linked content in a document. The host computing device can include one or more interfaces configured to provide communication with at least one other computing device over a network. The host computing device can also include a processor, in communication with the one or more interfaces, configured to run a module stored in memory that is configured to detect a user's action to initiate editing of a first content embedded in a first document associated with a host application program running on the host computing device. The module stored in the memory is also configured to query for the user's embedded content management configuration to determine a target computing device having an interface suitable for editing the first embedded content. If it is determined that the user's embedded content management configuration specifies a computing device other than the host computing device as the target computing device, the module stored in the memory is further configured to send a first notification to the target computing device. The first notification includes one of a copy of or a reference to the first document indicating where the first document can be located. The module stored in the memory is further configured to receive at least one second notification from the target computing device. The second notification includes one of a copy of or a reference to a latest version of the first document including at least latest edits made to the first embedded content.

The disclosed subject matter further includes a non-transitory computer readable medium. The computer readable medium can have executable instructions operable to cause a computing device to detect at a host computing device running a host application program a user's action to initiate editing of a first content embedded in a first document associated with the host application program. The computer readable medium can also include executable instructions operable to cause the computing device to query for the user's embedded content management configuration to determine a target computing device having an interface suitable for editing the first embedded content. The computer readable medium can further include executable instructions operable to cause the computing device to send a first notification to the target computing device. The first notification includes one of a copy of or a reference to the first document indicating where the first document can be located. The computer readable medium can further include executable instructions operable to receive at least one second notification from the target computing device. The second notification includes one of a copy of or a reference to a latest version of the first document including at least latest edits made to the first embedded content.

The computer readable medium can further include executable instructions operable to receive a third notification from a source computing device. The third notification includes one of a copy of a second document including a second embedded content or a reference to the second document and an identification of the second embedded content to be edited. The computer readable medium can further include executable instructions operable to, in response to receiving the third notification, cause a selected target application program to be instantiated and to access the second document such that the user can edit the second embedded content at the host computing device using the target application program. The target application program is selected based on a type of the second embedded content. The computer readable medium can further include executable instructions operable to send at least one fourth notification to the source computing device, including a last of the at least one forth notification that is sent to the source computing device when the user finishes editing the second embedded content.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be had to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems, methods and media of the disclosed subject matter and the environment in which such systems, methods and media may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems, methods and media that are within the scope of the disclosed subject matter.

The disclosed subject matter relates to systems, methods and media for managing content that is embedded in a document. Specifically, the disclosed systems, methods and media provide ways in which a device most suitable for generating and/or manipulating (e.g., editing) a particular type of content embedded in a document is used to perform the generation and/or manipulation of the embedded content.

Figure 1:
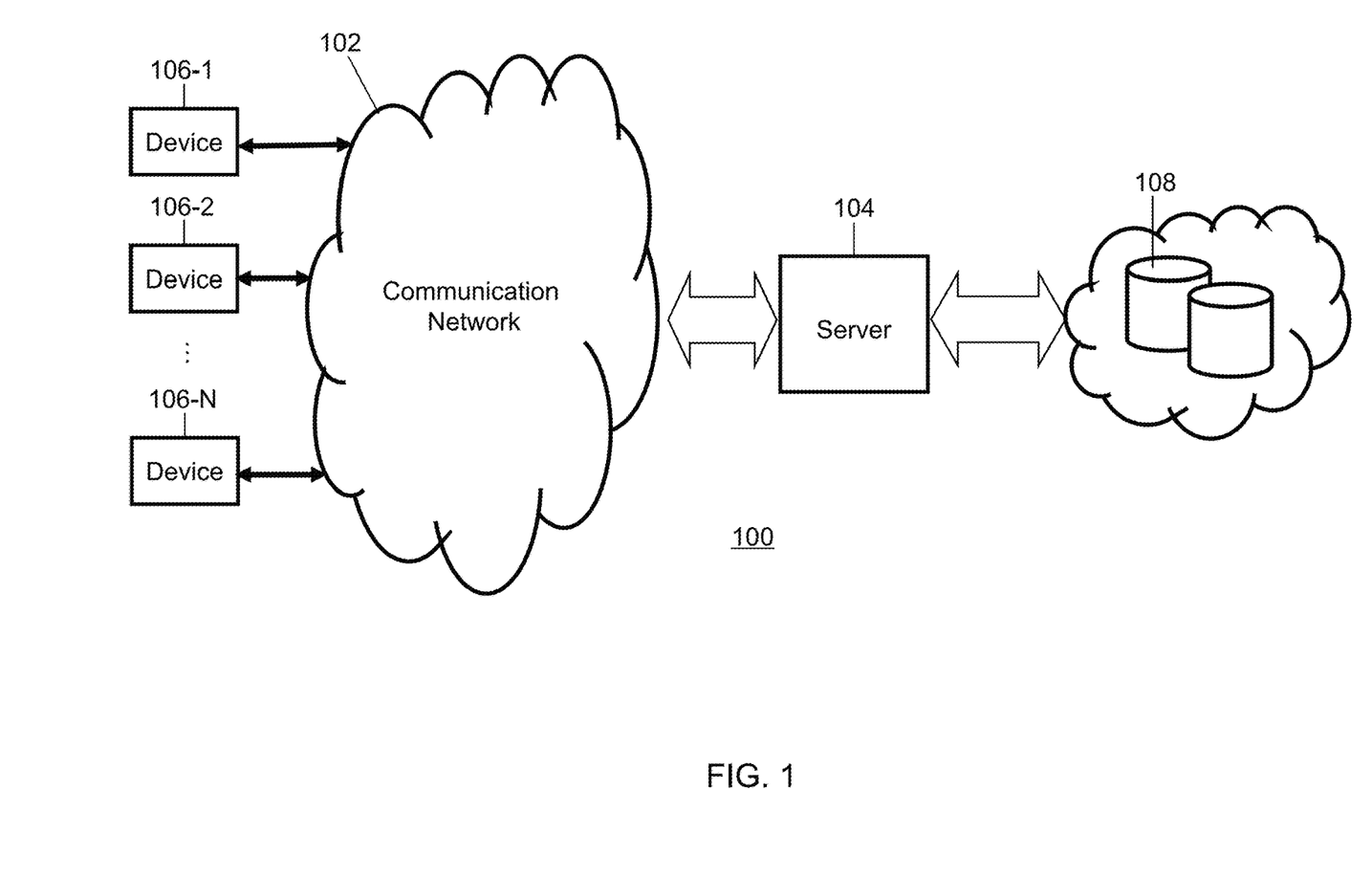
FIG. 1 illustrates a diagram of a networked communication system in accordance with certain embodiments of the disclosed subject matter.

FIG. 1 illustrates a diagram of a networked communication arrangement 100 in accordance with certain embodiments of the disclosed subject matter. The networked communication arrangement 100 can include a communication network 102, a server 104, at least one computing device (also referred to as client device) 106 (e.g., devices 106-1, 106-2, . . . 106-N), and a database 108.

Each device 106 can send data to, and receive data from, the server 104 over the communication network 102. Each device 106 can be directly coupled to the server 104; alternatively, each device 106 can be connected to the server 104 via any other suitable device(s), communication network(s), or combination thereof. For example, each device 106 can be coupled to the server 104 via one or more routers, switches, access points, and/or communication networks (as described below in connection with the communication network 102). Each device 106 can also send data to, and receive data from, other devices 106. The device 106 can include a desktop computer, a mobile computer, a tablet computer, a cellular device, a smartphone or any computing system that is capable of performing computation.

The server 104 can be a single server, or a network of servers, or a farm of servers in a data center. For example, the server 104 may be a Dropbox™ or other suitable server for providing dropbox or other suitable services that can interact with one or more computing devices, such as devices 106, which run a dropbox client process, for storing and maintaining documents that are created and updated by users.

The communication network 102 can include a network or combination of networks that can accommodate private data communication. For example, the communication network 102 can include a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. Such networks may be implemented with any number of hardware and software components, transmission media and network protocols. FIG. 1 shows the network 102 as a single network; however, the network 102 can include multiple interconnected networks listed above.

The server 104 can be coupled to a database system. The database 108 can include at least one of two types of database: a local database and a remotely located database. The database 108 can include any data supported by one or more data structures; alternatively, it could include one or more database management system (DBMS) or a distributed database. For example, the database 108 may include a data structure, or one or more data tables in a DBMS, for storing information related to documents having embedded contents. The database 108 may also include a data structure, or one or more data tables in the DBMS, for storing information related to configuration parameters for specifying different devices that are most suitable for creating and/or manipulating (e.g., editing) different types of embedded content. The database 108 can also include at least one of a relational database, object database (a.k.a., object-oriented database), XML database, cloud database, active database, and a data warehouse. The database 108 may include at least one physical, non-transitory storage medium. In some embodiments, the database 108 may be a shared, central storage area (e.g., cloud storage) for dropbox services.

In some embodiments, the database 108 can be provided as an enterprise system in a corporate environment For example, the communication network 102, the (proxy) server 104, the clients 106, and the database 108 can be located in a close proximity and can be a part of a single company. In some cases, the (proxy) server 104, the clients 106, and the database 108 can be located in the same building and can be coupled to one another via a local communication network. The local communication network can include a local area network (LAN), a corporate network, and a virtual private network (VPN) associated with the corporate network. FIG. 1 shows the database 108 as separate from the communication network 102. However, the database 108 can be part of the communication network 102 or another communication network.

Figure 2:
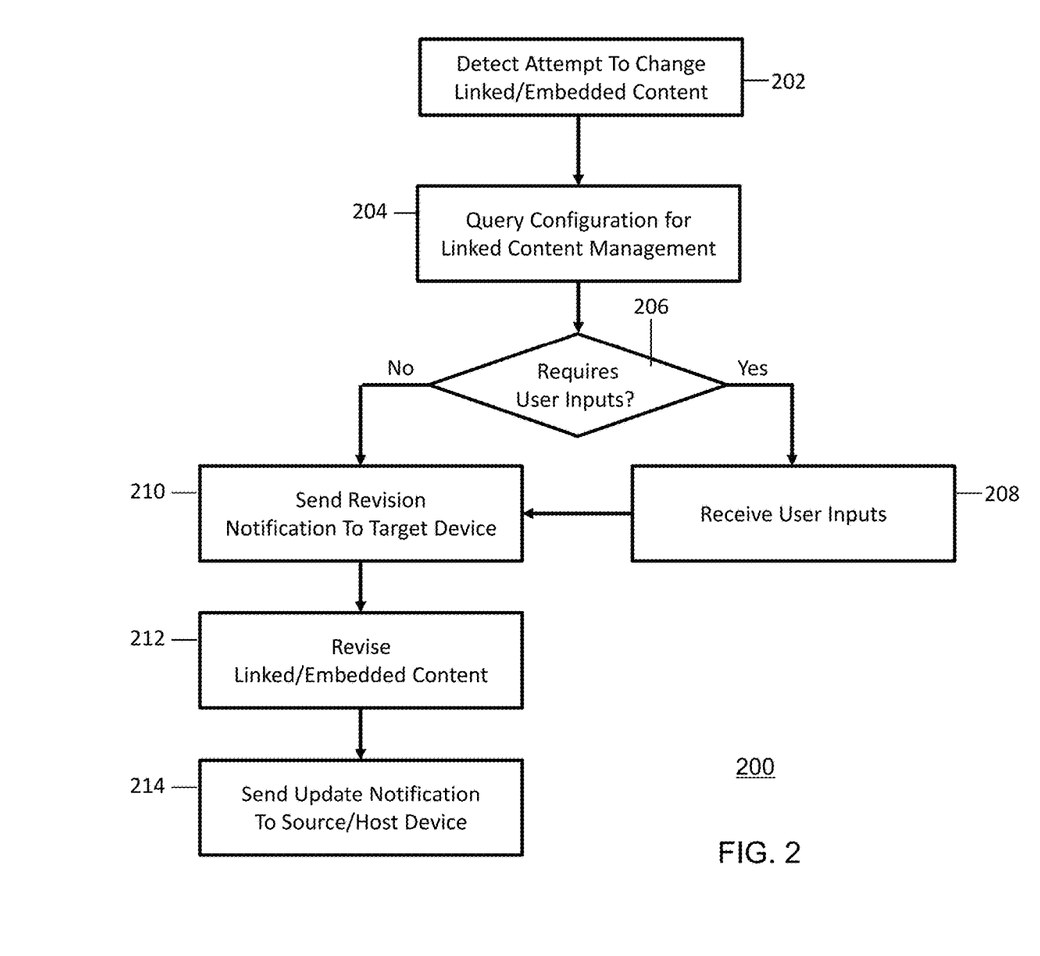
FIG. 2 is a flow diagram for managing linked content in a document in accordance with certain embodiments of the disclosed subject matter.

FIG. 2 is a flow diagram 200 for managing embedded/linked content in a document in accordance with certain embodiments of the disclosed subject matter. When a user initiates editing of content that is embedded in a document from an application program running on a host device (host application program), for example, a prompt may be presented to the user to select an appropriate device, or a combination of an appropriate application program and device, for editing the embedded content. In some embodiments, the prompt is presented using a drop-down menu. Table 1 shows an exemplary dropdown menu that can be presented for a user to select a combination of one or more devices (e.g., iPad™ or other tablet computers, Laptop, Desktop or mobile/cell phones including smartphones) and applications (e.g., Adobe™ Acrobat™, Photoshop™, Microsoft™ Paint™, Word™, Excel™, PowerPoint™ and other suitable applications including Image Editors and Vector Editors). In some embodiments, a user can set one or more devices for real-time or near real-time editing and update. In some embodiments, one or more devices are pre-set for certain types of embedded content.

TABLE 1

| Dropdown Menu for Choosing Device/Application Combination |
|---|
| Open |
| Open With |
|    Rich's iPad |
|       Image Editor |
|       Vector Editor |
|    Rich's Windows Laptop |
|       MS Paint |
|       Photoshop |

If a user selected device (e.g., a device providing an interface that is most suitable for editing the embedded content) is different from the current host device, a change/revision notification may be sent to the user selected editing device along with a copy of, or a reference to, the document. The notification, when received at the editing device, triggers a necessary application program to be launched for editing the embedded content. When changes/edits are made to the embedded content using the application program running on the editing device, an update notification is sent back to the host device along with a copy of, or a reference to, the latest version of the document including the edits/changes to the embedded content such that the host device can present the updated document with the edited embedded content within the host application program.

Referring to FIG. 2, a process running in the background of a host device (host background process) detects at 202, e.g., via an interprocess communication technique, an attempt by a user interacting with a word processing application to change content that is embedded in a word processing document. In some embodiments, the host background process can also detect a user's attempt to insert/embed content to a document. Suppose, for example, a user is running an instance of Microsoft™ Word™ (MS-Word) on her laptop computer to update a Word document that includes an embedded photographic image. When the user initiates an editing of the embedded photographic image, e.g., by double-clicking on the embedded image, or attempts to insert a downloaded photograph in the Word document, a process running in the background of the laptop computer can detect the user's action. In some embodiments, the background process may be a dynamic link library. In other embodiments, the process may be a (background) daemon process.

At 204, the host background process queries for configuration information regarding embedded content management for the user. An embedded content management configuration specifies which device, or a combination of a device and an application program, is most suitable (or should be used) for editing each type of embedded content. For example, an embedded content management configuration for a user may specify that a photo editing application running on a tablet PC is most suitable (or should be used) to edit a photographic image that is embedded in a document and that a word processing application running on a laptop or a desktop computer is most suitable (or should be used) to edit the text in the document. In some embodiments, an embedded content management configuration is maintained in a central storage location for each user. In some embodiments, the embedded content management configuration is made a part of each user's network profile. In some embodiments, users are enabled to create, revise and delete an embedded content management configurations, e.g., through a graphical user interface.

Referring back to the MS-Word document example used in connection with the detecting step at 202, for instance, the background process running on the user's laptop computer queries for and retrieves the user's embedded content management configuration upon detection of the user's attempt to edit the embedded photographic image, e.g., to determine a device most suitable for editing the embedded image. For instance, the user's embedded content management configuration may specify that the Adobe™ Photoshop™ Touch installed on the user's Apple™ iPad™ is most suitable (and/or should be used) for editing the embedded photographic image. In some embodiments, the host background process can be configured to cache the user's configuration information. In other embodiments, the user's embedded content management configuration may be stored in a text-based configuration file that can be read by the host background processor.

At 206, it is determined whether further user inputs are required for managing (e.g., generating, editing) embedded content in a document. In some instances, for example, an embedded content management configuration may not yet exist for a user when the user attempts to change embedded content in a document. In other instances, a user's configuration for embedded content management may specify that the user should be given a chance to provide alternative inputs that may be used instead of the information provided in the relevant parts of the configuration specification. If it is determined at 206 that further inputs are required from the user, the user is prompted for the required inputs and the required inputs are received at 208. In some embodiments, the user may be merely asked whether she wishes to provide alternative inputs (e.g., a desired target device and/or application program for editing a particular type of embedded content) and, if the user so indicates, the user will be given an option to provide alternative inputs.

If, however, it is determined at 206 that no further user inputs are required, or desired, the background process running on the host device sends at 210 a revision notification to a target device that is determined at 204 to be the most suitable (or selected at 208 as the most desirable) for editing the embedded content. In some embodiments, the host background process automatically sends a revision notification to a desired target device after learning the desired target device, or a combination of the desired target device and a desired application program running in the target device, from the user's embedded content management configuration. In some embodiments, the host background process first displays the target device, or the combination of a target device and a target application program, specified in the user's content management configuration and asks the user whether the user wishes to provide an alternative target device (or an alternative target application program or both). If the user so desires (to provide alternative inputs), the background host process may, in some embodiments, further prompt the users using, e.g., a dropdown menu, such as the dropdown menu shown in Table 1.

The revision notification, in some embodiments, includes a copy of, or a reference to, the source document that includes the embedded content to be edited. Referring back to the MS-Word document example, for instance, the background process running on the user's laptop computer sends a revision notification including a copy, or location information (e.g., file path), of the MS-Word document to the user's iPad™ for editing the photographic image embedded in the MS-Word document. If the revision notification includes location information, such a file path, of the MS-Word document, the document may be found in a file folder associated with the file path that is accessible from the user's iPad™. For instance, the Word document can be stored in the host device and a file path for a folder in the host device where the document is stored can be included in the revision notification.

In some embodiments, a central storage service, such as the services offered by Dropbox™, that enables users to store documents once and access the stored documents from multiple devices may be used. In the MS-Word document example, for instance, the background process running on the user's laptop computer can send a revision notification to the user's iPad™ along with a reference (e.g., a file path associated with a storage location in a Dropbox server) to the MS-Word document, thereby eliminating the need to send an actual copy of the MS-Word document.

At 212, the content embedded in the document is edited. Referring back to the MS-Word document example, for instance, a background process running on the user's iPad™ triggers the Adobe™ Photoshop Touch™ installed on the iPad™ to be instantiated and executed, when the revision notification is received from the user's laptop computer. The background process running on the user's iPad™ also retrieves, e.g., the file path of the MS-Word document (and, in some embodiments, an identification/location information related to the embedded photographic image in the MS-Word document), from the revision notification and passes it to the Photoshop™ Touch. The Photoshop™ Touch then accesses the photographic image embedded in the MS-Word document using the retrieved file path (and the identification/location information for the embedded image) so that the user can edit the image using a direct input means, such as a stylus or fingers, rather than using proxied input devices, such as a mouse or a keyboard. In some embodiments, the MS-Word document displayed on the user's laptop computer screen can be seamlessly updated in near real-time as the embedded photographic image is being edited by the user in the user's iPad™.

At 214, the background process running in the target device sends an update notification to the host device when the editing of the embedded content in the document is completed. In some embodiments, the update notification includes a copy of or a reference to, the latest version of the document including the most recent edits. In some embodiments, more than one update notification may be sent to the host device before the editing of the embedded content is completed. Referring back to the MS-Word document example, for instance, when the user completes the editing of the embedded photographic image, the background process running in the user's iPad™ sends to the user's laptop computer an update notification including a file path to the latest version of the MS-Word document that includes the edited photographic image.

When the background process running on the user's laptop computer receives the update notification, the background process causes the MS-Word running on the laptop computer to open the latest version of the MS-Word document for the user, e.g., to view the updated document or to further update the text of the document. In some cases, the background process running in the user's iPad™ may send more than one update notification (including one or more intermediate update notifications) to the user's laptop computer periodically (e.g., once every 10 minutes or when the user saves the edited embedded image) until the user finishes editing the embedded image. In such cases, the background process running on the user's laptop computer may cause the MS-Word running on the laptop computer to display the most recently updated version of the Word document in response to each of the periodic update notifications.

Figure 3:
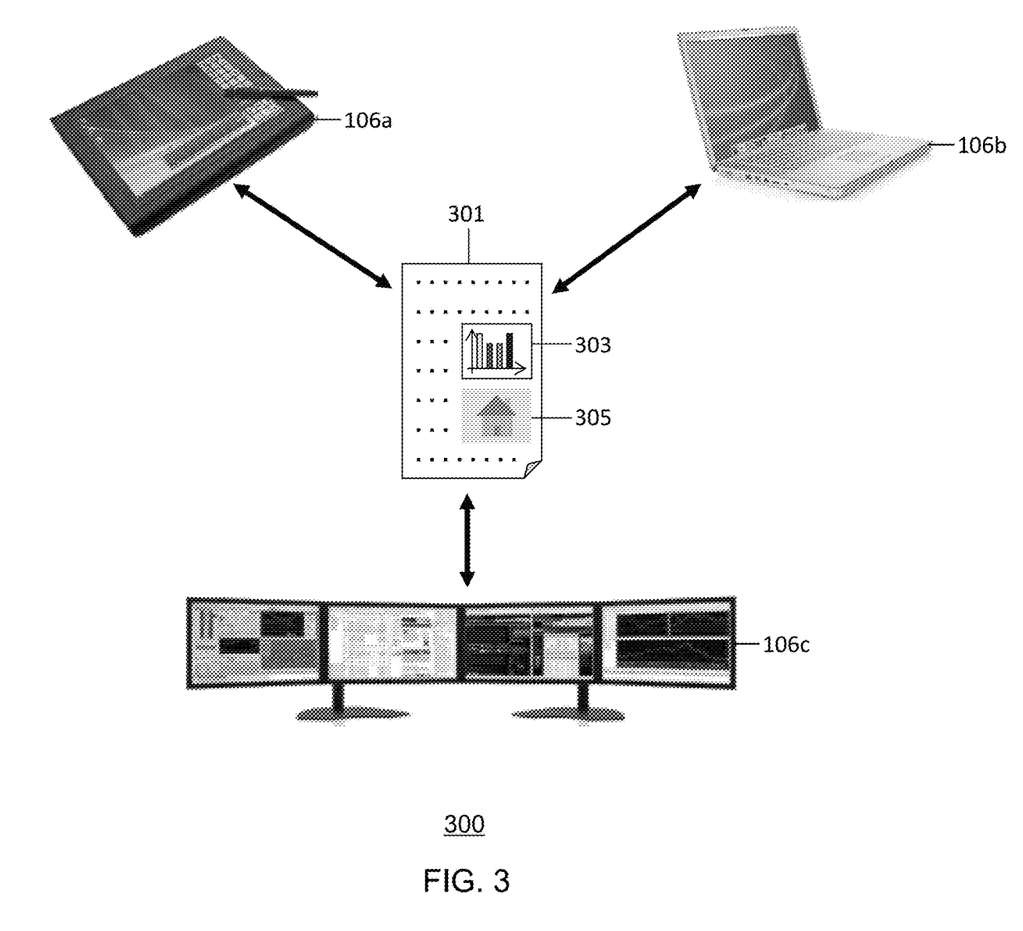
FIG. 3 is a diagram illustrating a net effect of managing linked content in a document in accordance with certain embodiments of the disclosed subject matter.

FIG. 3 is a flow diagram 300 illustrating a net effect of managing linked/embedded content in a document in accordance with certain embodiments of the disclosed subject matter. A net effect of managing embedded content in a document, e.g., as described in connection with FIG. 2, is that any document including one or more embedded content, such as a document 301 including embedded content 303 and 305, can be readily passed from one type of computing device having the most suitable interface (i.e., amongst a set of devices a user may own or has access to) for editing one type of embedded content to the next computing device having the most suitable interface (again, i.e., the most suitable amongst the devices available to the user) for editing a different type of embedded content, thereby enabling the user to take a full advantages of each different interface, which may be provided by a different device in a set of devices that are available to the user.

For example, a tablet computing device 106a having a multi-touch screen display may be suitable for editing an embedded image or photograph, whereas a laptop computer 106b (or any other computing device having a keyboard, a mouse and a display screen) may be better suited for editing text portions of a document. A multi-user device having multi-display screens 106c may be suitable for editing an embedded content by multiple users while having a discussion amongst the users regarding the editing.

Figure 4:
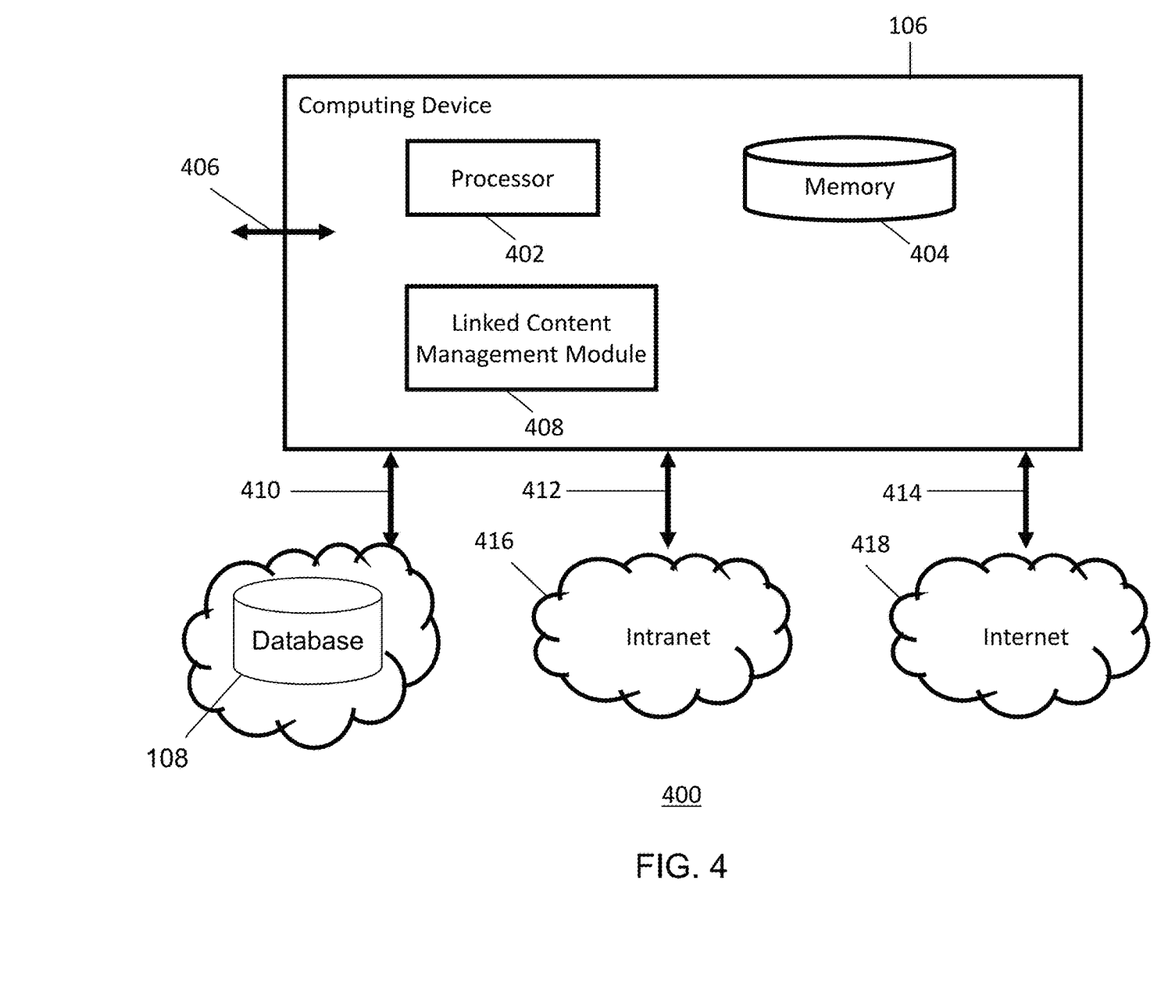
FIG. 4 is a block diagram of a computing device in accordance with certain embodiments of the disclosed subject matter.

FIG. 4 is a block diagram 400 of a computing device in accordance with certain embodiments of the disclosed subject matter. The block diagram 400 shows a computing device 106, which includes a processor 402, a memory 404, interfaces 406, 410, 412, and 414, a linked (embedded) content management module 408, a database 108, an Intranet 416, and the Internet 418. The memory 404 and the interfaces 406, 410, 412, and 414 are communicatively coupled to the processor 402. The computing device 106 can communicate with other computing devices and/or the server 104 (not shown) via the interface 406; the computing device 104 can communicate with the database 108 via the interface 410; the computing device 104 can communicate with the Intranet 416 via the interface 412; and the computing device 104 can communicate with the Internet 418 via the interface 414. The interfaces 406, 410, 412; and 414 are shown as separate interfaces but may be the same physical interface. The processor 402 can run software programs and modules, including the linked content management module 408. The memory 404 is capable of storing data that can be used by the processor 402 to run the software programs and modules.

The linked (embedded) content management (LCM) module 408 can be configured to communicate, or interact, with other computing devices 106 through, e.g., the interface 406 for managing content embedded in a document. For example, the LCM module 408 can detect when a user attempts to edit an embedded content in a document using a host application program executed by the processor 402 in the (host) computing device 106 and queries for the user's embedded content management configuration stored in the memory 404 or the database 108 to determine a target computing device (not shown) having an interface that is most suitable for editing the embedded content.

The LCM module 408 can be also configured to send a revision notification to the target computing device, if the target computing device is determined to be different from the (host) computing device 106 based on the content management configuration (or if an alternative computing device is selected by the user when prompted by the LCM module 408). For instance, the LCM module 408 can prompt the user to provide further inputs to determine a target computing device, or to confirm that the user wishes to use the target computing device specified in the content management configuration for editing the embedded image. The LCM module 408 can be also configured to cause the host application program to access a latest version of a document in response to receiving one or more update notification from a target computing device.

The LCM module 408 can be further configured to receive a revision notification including a copy of, or a reference to, a document from a source computing device (not shown) and, in response to receiving the revision notification, trigger an appropriate (or designated) application program to be initiated for the user to edit an embedded content included in the document. The LCM module 408 can be also configured to send to the source computing device an update notification including a copy of, or a reference to, the latest version of the document with the latest edits to the embedded content, when the user finishes editing the embedded content. In some embodiments, the LCM module 408 can be configured to send more than one update notification to the source computing device. For example, the LCM module 408 can send one or more intermediate update notification periodically until the user finishes editing the embedded content.

In some embodiments, the LCM module 408 may be also configured to inform the user of an identity of the target computing device and provide a prompt to ask the user to confirm whether the user wants to use the target computing device specified in the content management configuration for editing the first embedded content. If the user indicates that she does not want to use the target computing device specified in the content management configuration, the LCM module 408 may be further configured to receive from the user an identity of an alternative target computing device, and substitute an identification of the target computing device with the identification of the alternative target computing device so that the first notification is sent to the alternative target computing device and the at least one update notification is received from the alternative target computing device.

The linked content management module 408 can be implemented in software using the memory 404. The memory 404 can be a non-transitory computer readable medium, flash memory, a magnetic disk drive, an optical drive, a programmable read-only memory (PROM), a read-only memory (ROM), or any other memory or combination of memories. The software can run on a processor 402 capable of executing computer instructions or computer code. The processor 402 might also be implemented in hardware using an application specific integrated circuit (ASIC), programmable logic array (PLA), field programmable gate array (FPGA), or any other integrated circuit.

FIG. 4 shows a computing device 106 having the linked content management module 408 that performs the above-described operations in accordance with certain embodiments of the disclosed subject matter. The computing device 106 may include additional modules, less modules, or any other suitable combination of modules that perform any suitable operation or combination of operations.

The computing device 106 can include user equipment. The user equipment can communicate with one or more radio access networks and with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian™ OS, iPhone™ OS, iOS, RIM's Blackberry™, MS Windows™ Mobile, Linux, HP WebOS™, and Android. The screen might be a touch screen that is used to input data to the mobile device, in which case the screen can be used instead of the full keyboard. The user equipment can also keep global positioning coordinates, profile information, or other location information.

The computing device 106 also includes any platforms capable of computations and communication. Non-limiting examples can include televisions (TVs), video projectors, set-top boxes or set-top units, digital video recorders (DVR), computers, netbooks, laptops, desktops, and any other audio/visual equipment with computation capabilities. The computing device 106 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The computing device 106 can also provide a variety of user interfaces such as a keyboard, a touch screen, a trackball, a touch pad, and/or a mouse. The computing device 106 may also include speakers and a display device in some embodiments.

The disclosed systems, methods and media provide ways in which a device most suitable for generating and/or manipulating (e.g., editing) a particular type of content embedded in a document is used to perform the generation and/or manipulation of the embedded content. In some embodiments, for example, a user, who may be a fashion designer, receives via an email a document including multiple embedded images that describe clothes embodying new designs that would be put on a next big fashion show. The user opens the document from her laptop computer using a word processing application program running on the laptop. She looks through the embedded images and immediately recognizes that a handful of revisions must be made to one of the images before the images are sent to a garment factory for a final production. When the user double-clicks on the embedded image requiring an edit to make the necessary changes, a small (e.g., light-weight) background process running in the background of her laptop computer detects that the user is attempting to edit the embedded image and queries for the user's content management configuration.

The background process learns from the user's content management configuration that the user has previously specified her tablet PC having a multi-touch screen interface as the designated target device for editing embedded images using a stylus. The configuration also specifies that the user should be prompted for a confirmation that she wants to use the specified/designated target device before, e.g., a document is transferred from a host device to another device for an editing of an embedded content. Accordingly, the background process prompts the user whether she wants to use her tablet PC to edit the embedded image. The user confirms for the use of her tablet PC for editing the embedded image. Next, the background process sends a revision notification to the user's tablet PC along with a file path associated with the received document, e.g., stored in a dropbox storage. When a process running in the background of the user's tablet PC receives the revision notification, the tablet PC background process causes a touch drawing application program to be instantiated and to access the embedded image to be edited. When the touch drawing application program is started up in the user's table PC, the user starts editing the embedded image.

When the user finishes editing the embedded image and closes the touch drawing application program, the background process running in the tablet PC sends an update notification to the user's laptop computer along with a file path associated with the latest version of the document. The host background process running on the user's laptop computer, in response to receiving the update notification, retrieves the file path of the latest version of the document including the edited image and causes the host word processing application program to display the latest document. The user reviews the latest document with the edited image, attaches the document to a reply email and sends it to a production manager in the garment factory for production of the design clothing.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method for managing embedded content in a document, the method comprising:
    presenting, using a host application program running on a host computing device, a first version of a document having an embedded file;
    detecting an action from a user to initiate editing of the embedded file;
    identifying, by executing a query to retrieve embedded content management configuration data for the user, a target computing device from a set of target computing devices and a target application program configured to run on the target computing device, the target computing device indicated by the embedded content management configuration data to have an interface that is most suitable to edit the embedded file from a set of interfaces of the set of target computing devices;
    determining that the embedded content management configuration data indicates a computing device other than the host computing device as the target computing device;

presenting a prompt to the user that requests the user to indicate whether the user wants to use the target computing device to edit the embedded file;

in response to the user indicating that the user wants to use the target computing device to edit the embedded file, sending, using the host application program, a request to the target computing device such that the request, when received by the target computing device, causes the target computing device to run the target application program to edit the embedded file, the request including a copy of or a reference to the first version of the document;

receiving, after the sending the request, at the host computing device at least one notification from the target computing device, wherein the at least one notification includes a copy of or a reference to a second version of the document including at least one edit made to the embedded file by the user using the target application; and presenting, using the host application program, the second version of the document in response to receiving the at least one notification from the target computing device.

2. The method of claim 1, wherein the embedded file is a first embedded file in the document and the target computing device is a first target computing device, the method further comprising:

detecting an additional action to initiate editing of a second embedded file in the document;

identifying, by executing a query to retrieve additional embedded content management configuration data for the user, a second target computing device from the set of target computing devices and indicated by the additional embedded content management configuration data to have an interface that is most suitable to edit the second embedded file from the set of interfaces of the set of target computing devices;

determining that the additional embedded content management configuration data indicates the host computing device as the second target computing device;

receiving at least one edit made to the second embedded file by the user; and presenting, using the host application program, a third version of the document including the at least one edit.

3. The method of claim 1, wherein the at least one notification is a first notification, the document is a first document, the embedded file is a first embedded file, and the target application program is a first target application program, the method further comprising:

receiving a second notification from a source computing device, wherein the second notification includes at least one of: a copy of a first version of a second document including a second embedded file, or a reference to the first version of the second document and an identification of the second embedded file;

identifying a second target application program based on a type of the second embedded file;

running the second target application program and loading the second document using the second target application program such that the user can edit the second embedded file at the host computing device using the second target application program; and sending a third notification to the source computing device, the third notification including a copy of or a reference to a second version of the second document including at least one edit made to the second embedded file by the user using the second target application program.

4. The method of claim 3, wherein the second notification further includes an identity of a designated target application program, the second target application program identified as the designated target application program.

5. The method of claim 1, wherein the embedded file includes an image, the host application program is a word processing application program, and the document is a word processing document.

6. The method of claim 1, wherein the host computing device includes a laptop computer and the target computing device includes a tablet computing device.

7. A host computing device for managing embedded content in a document, the host computing device comprising:

one or more interfaces configured to provide communication with at least one other computing device over a network; and a processor, in communication with the one or more interfaces, configured to:

detect an action from a user to initiate editing of an embedded file in an initial version of a document associated with a host application program running on the host computing device;

identify, by executing a query to retrieve embedded content management configuration data for the user, a target computing device from a set of target computing devices and a target application program configured to run on the target computing device, the target computing device indicated by the embedded content management configuration data to have an interface that is most suitable to edit the embedded file from a set of interfaces of the set of target computing devices;

determine that the embedded content management configuration data indicates a computing device other than the host computing device as the target computing device;

present a prompt to the user that requests the user to indicate whether the user wants to use the target computing device to edit the embedded file;

in response to the user indicating that the user wants to use the target computing device to edit the embedded file, send a request to the target computing device such that the request, when received by the target computing device, causes the target computing device to run the target application program to edit the embedded file, the request including a copy of or a reference to the initial version of document;

receive, after sending the request, a plurality of notifications from the target computing device, wherein each notification from the plurality of notifications includes a copy of or a reference to a latest version of the document, the latest version of the document including at least one latest edit associated with that notification and made to the embedded file by the user using the target application; and for each notification from the plurality of notifications, present, using the host application program, the latest version of the document associated with that notification in response to receiving that notification.

8. The computing device of claim 7, wherein the embedded file is a first embedded file in the document and the target computing device is a first target computing device, wherein the processor is further configured to:

detect an additional action to initiate editing of a second embedded file in the document;

identify, by executing a query to retrieve additional embedded content management configuration data for the user, a second target computing device from the set of target computing devices and indicated by the additional embedded content management configuration data to have an interface that is most suitable to edit the second embedded file from the set of interfaces of the set of target computing devices;

determine that the additional embedded content management configuration data indicates the host computing device as the second target computing device;

receive at least one edit made to the second embedded file by the user; and present, using the host application program, an additional version of the document including the at least one edit.

9. The computing device of claim 7, wherein the host computing device includes a laptop computer, the target computing device includes a tablet computing device, the document includes a word processing document, the host application program includes a word processing application program, and the embedded file includes a photographic image.

10. The computing device of claim 7, the document is a first document, the embedded file is a first embedded file, and the target application program is a first target application program, wherein the processor is further configured to:

receive a first notification from a source computing device, wherein the first notification includes at least one of: a copy of a first version of a second document including a second embedded file, or a reference to the first version of the second document and an identification of the second embedded file;

identify a second target application program based on a type of the second embedded file;

run the second target application program and loading the second document using the second target application program such that the user can edit the second embedded file at the host computing device using the second target application program; and send a third notification to the source computing device, the third notification including a copy of or a reference to a second version of the second document including at least one edit made to the second embedded file by the user using the second target application program.

11. The computing device of claim 10, wherein the second notification further includes an identity of a designated target application program, the second target application program identified as the designated target application program.

12. The computing device of claim 10, wherein the source computing device includes a laptop computer, the host computing device includes a tablet computing device, the second document includes a document having a set of presentation slides, the selected target application program includes a photo workshop application program, and the second embedded file includes a photographic image.

13. The computing device of claim 7, wherein the processor is configured to present, for each notification from the plurality of notifications, the latest version of the document associated with that notification and including one or more edits made to the embedded file in near-real time.

14. A non-transitory computer-readable medium having executable instructions operable to cause a computing device to:

detect, at a host computing device running a host application program, an action from a user to initiate editing of an embedded file in a first version of a document associated with the host application program;

identify, by executing a query to retrieve embedded content management configuration data for the user, a target computing device from a set of target computing devices and a target application program configured to run on the target computing device, the target computing device indicated by the embedded content management configuration data to have an interface that is most suitable to edit the embedded file from a set of interfaces of the set of target computing devices;

determine that the embedded content management configuration data indicates a computing device other than the host computing device as the target computing device;

receive an input from the user indicating that the user wants to use the target computing device and the target application program to edit the first embedded file;

in response to receiving the input indicating that the user wants to use the target computing device and the target application program to edit the embedded file, send a request to the target computing device such that the request, when received by the target computing device, causes the target computing device to run the target application program to edit the embedded file, the request including a copy of or a reference to the first version of the document; and receive, after sending the request, at least one notification, wherein the at least one notification includes a copy of or a reference to a second version of the document including at least one edit made to the embedded file by the user using the target application program.

15. The computer-readable medium of claim 14, wherein the at least one notification is a first notification, the document is a first document, the embedded file is a first embedded file, and the target application program is a first target application program, the executable instructions are further operable to cause the computing device to:

receive a second notification from a source computing device, the second notification includes at least one of: a copy of a first version of a second document including a second embedded file, or a reference to the first version of the second document and an identification of the second embedded file;

identify a second target application program based on a type of the second embedded file;

run the second target application program and load the second document using the second target application program to edit the second embedded file at the host computing device using the second target application program; and send a third notification to the source computing device, the third notification including a copy of or a reference to a second version of the second document including at least one edit made to the second embedded file by the user using the second target application program.

16. The computer-readable medium of claim 15, wherein the first document is located in a first storage that is accessible by at least the host computing device and the target computing device, and wherein the second document is located in a second storage that is accessible by at least the source computing device and the host computing device.

17. The computer-readable medium of claim 16, wherein at least one of the first storage and second storage includes a cloud storage.

18. The computer-readable medium of claim 16, wherein at least one of the first storage and the second storage is provided by a dropbox service.

* * * * *